(12) United States Patent
Osman et al.

(10) Patent No.: US 10,712,900 B2
(45) Date of Patent: Jul. 14, 2020

(54) VR COMFORT ZONES USED TO INFORM AN IN-VR GUI EDITOR

(71) Applicant: Sony Interactive Entertainment Inc., Tokyo (JP)

(72) Inventors: Steven Osman, San Mateo, CA (US); Jasmine Roberts, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/001,901

(22) Filed: Jun. 6, 2018

(65) Prior Publication Data
US 2019/0377473 A1  Dec. 12, 2019

(51) Int. Cl.
| | |
|---|---|
| *G06F 3/0481* | (2013.01) |
| *G06F 3/01* | (2006.01) |
| *G06T 7/70* | (2017.01) |
| *G06F 7/70* | (2006.01) |
| *G06F 3/0484* | (2013.01) |
| *G02B 27/01* | (2006.01) |
| *G06F 3/0346* | (2013.01) |

(52) U.S. Cl.
CPC ....... *G06F 3/04815* (2013.01); *G02B 27/017* (2013.01); *G06F 3/016* (2013.01); *G06F 3/0346* (2013.01); *G06F 3/0484* (2013.01); *G06T 7/70* (2017.01)

(58) Field of Classification Search
CPC combination set(s) only.
See application file for complete search history.

(56) References Cited

U.S. PATENT DOCUMENTS

| | | | | |
|---|---|---|---|---|
| 5,341,293 | A * | 8/1994 | Vertelney | G06F 3/0481 715/236 |
| 6,473,102 | B1 * | 10/2002 | Rodden | G06F 3/0481 715/781 |
| 7,370,284 | B2 * | 5/2008 | Andrea | G06F 9/451 715/788 |
| 9,015,641 | B2 * | 4/2015 | Bocking | G06F 3/0481 715/863 |
| 9,727,132 | B2 * | 8/2017 | Liu | G06F 3/012 |
| 10,402,470 | B2 * | 9/2019 | Esterly | G06F 3/0484 |
| 2017/0315608 | A1 * | 11/2017 | Shanware | G06F 3/011 |
| 2017/0354883 | A1 * | 12/2017 | Benedetto | A63F 13/533 |
| 2018/0095635 | A1 * | 4/2018 | Valdivia | G02B 27/0093 |

(Continued)

*Primary Examiner* — Motilewa Good Johnson
(74) *Attorney, Agent, or Firm* — Penilla IP, APC

(57) ABSTRACT

A non-transitory computer readable medium having program instructions configured to cause a computing device to execute an interface editor that performs the following operations: rendering through a head-mounted display (HMD) a view of a three-dimensional virtual space, the interface editor being configured to enable placement of user interface elements in the virtual space to define a virtual reality user interface for an interactive application; wherein the interface editor is configured to define within the virtual space a central zone and a lateral zone for placement of the user interface elements; receiving, by the interface editor, input indicating an attempt to move a given user interface element from the central zone to the lateral zone; responsive to receiving the input, generating, by the interface editor, a counteractive response that opposes the attempt to move the given user interface element from the central zone to the lateral zone.

20 Claims, 11 Drawing Sheets

(56) References Cited

U.S. PATENT DOCUMENTS

2018/0164952 A1* 6/2018 Yao .................... G06F 3/04886
2018/0278993 A1* 9/2018 Crisler ............. H04N 21/44218
2018/0356964 A1* 12/2018 Morris ................ G06F 3/04815

* cited by examiner

VR COMFORT ZONES USED TO INFORM AN IN-VR GUI EDITOR

FIELD OF THE DISCLOSURE

The present disclosure relates to user interface element customization for comfort in virtual reality.

BACKGROUND

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display (HMD). A head-mounted display is worn by the user and can be configured to present various graphics, such as a view of a virtual space. The graphics presented on a head-mounted display can cover a large portion or even all of a user's field of view. Hence, a head-mounted display can provide a visually immersive virtual reality experience to the user, as the HMD renders a three-dimensional real-time view of the virtual environment in a manner that is responsive to the user's movements. The user wearing an HMD is afforded freedom of movement in all directions, and accordingly can be provided a view of the virtual environment in all directions via the HMD.

It is in this context that implementations of the disclosure arise.

SUMMARY

Implementations of the present disclosure include devices, methods and systems relating to user interface element customization for comfort in virtual reality.

In some implementations, a non-transitory computer readable medium is provided, having program instructions embodied thereon, the program instructions being configured to, when executed by a computing device, cause said computing device to execute an interface editor that performs the following operations: rendering, by the interface editor, through a head-mounted display (HMD) a view of a three-dimensional virtual space, the interface editor being configured to enable placement of user interface elements in the virtual space to define a virtual reality user interface for an interactive application; wherein the interface editor is configured to define within the virtual space a central zone and a lateral zone for placement of the user interface elements, the central zone being at a front-facing direction from a viewpoint in the virtual space from which a user of the interactive application will view the virtual reality user interface when interacting with the interactive application, the lateral zone being adjacent to the central zone; receiving, by the interface editor, input indicating an attempt to move a given user interface element from the central zone to the lateral zone; responsive to receiving the input, generating, by the interface editor, a counteractive response that opposes the attempt to move the given user interface element from the central zone to the lateral zone.

In some implementations, the central zone spans a horizontal angle having a vertex at the viewpoint in the virtual space, the horizontal angle being approximately 90 to 100 degrees, the lateral zone spanning an additional angle adjacent to the horizontal angle.

In some implementations, the input is generated from a motion controller configured to control positioning of the given user interface element in the virtual space.

In some implementations, the counteractive response includes maintaining the given user interface element within the central zone.

In some implementations, maintaining the given user interface element within the central zone is performed until the input exceeds a predefined threshold of time and/or intended movement of the given user interface element.

In some implementations, the counteractive response includes one or more of a visual notification rendered in the virtual space, an audio notification, and/or a tactile feedback notification.

In some implementations, a method executed by a computing device is provided, comprising: rendering through a head-mounted display (HMD) a view of a three-dimensional virtual space, the interface editor being configured to enable placement of user interface elements in the virtual space to define a virtual reality user interface for an interactive application; defining within the virtual space a central zone and a lateral zone for placement of the user interface elements, the central zone being at a front-facing direction from a viewpoint in the virtual space from which a user of the interactive application will view the virtual reality user interface when interacting with the interactive application, the lateral zone being adjacent to the central zone; receiving input indicating an attempt to move a given user interface element from the central zone to the lateral zone; responsive to receiving the input, generating a counteractive response that opposes the attempt to move the given user interface element from the central zone to the lateral zone.

In some implementations, a system is provided, comprising: a head-mounted display (HMD); a computing device connected to the HMD, the computing device executing an interface editor that performs the following operations: rendering, by the interface editor, through a head-mounted display (HMD) a view of a three-dimensional virtual space, the interface editor being configured to enable placement of user interface elements in the virtual space to define a virtual reality user interface for an interactive application; wherein the interface editor is configured to define within the virtual space a central zone and a lateral zone for placement of the user interface elements, the central zone being at a front-facing direction from a viewpoint in the virtual space from which a user of the interactive application will view the virtual reality user interface when interacting with the interactive application, the lateral zone being adjacent to the central zone; receiving, by the interface editor, input indicating an attempt to move a given user interface element from the central zone to the lateral zone; responsive to receiving the input, generating, by the interface editor, a counteractive response that opposes the attempt to move the given user interface element from the central zone to the lateral zone.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 6A-1 and 6A-2 illustrate a head-mounted display (HMD), in accordance with an implementation of the disclosure.

DETAILED DESCRIPTION

Figure 1:
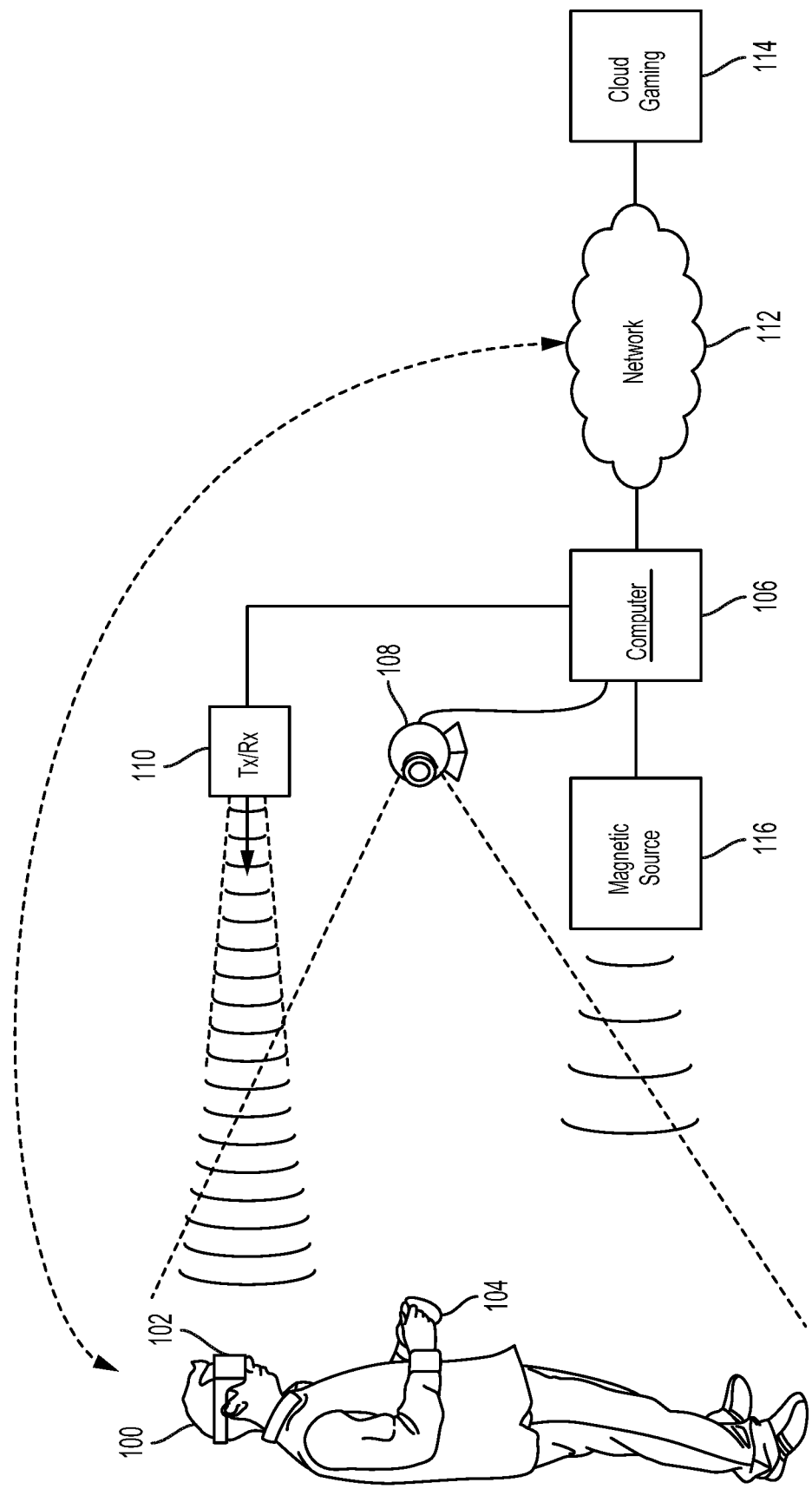
FIG. 1 illustrates a system for interaction with a virtual environment via a head-mounted display (HMD), in accordance with an implementation of the disclosure.

The following implementations of the present disclosure provide devices, methods, and systems relating to user interface element customization for comfort in virtual reality. It will be obvious, however, to one skilled in the art that the present disclosure may be practiced without some or all of the specific details presently described. In other instances, well known process operations have not been described in detail in order not to unnecessarily obscure the present disclosure.

As virtual reality grows in adoption, so it is important for application designers to design interfaces that are comfortable for users in virtual reality. The immersive and three-dimensional nature of virtual reality can be difficult to fully appreciate on a two-dimensional display screen. Hence, one of the best places to design a virtual reality user interface is directly in virtual reality. This can enable the designer to be assured that the eventual user of the application can reach all of the elements and that they have been laid out in a pleasing and accessible manner.

In accordance with implementations of the disclosure, an interface editor can be configured to define various VR comfort zones that are used to inform an in-VR design, such as zones that require looking straight ahead, moving one's eyes only, moving eyes and neck/head, or moving eyes, neck/head, and rotating shoulders. There can also be a zone that requires one to turn all the way around, by way of example without limitation.

Thus, in some implementations, an in-VR user interface toolkit is provided that allows a designer to lay out user interfaces with automatic snapping/rubber banding to the comfort zones. In various implementations, features may include automatic layout so that elements are packed pleasingly within the current zone. Visual, audio and haptic feedback can warn the designer that they are trying to break a zone wall into another zone as the designer drags elements. The system can automatically grow a zone to incorporate the larger zone if you override its recommendations.

In some implementations, the system can also have loose zone walls that allow for freeform layout of elements, but then an optimization phase that proposes layouts for each of the zone configurations (e.g. a dense/tight layout that all fits into the zone that requires no movement, as well as a more dispersed layout that may require the user to move their eyes or head).

In various implementations, the methods, systems, image capture objects, sensors and associated interface objects (e.g., gloves, controllers, peripheral devices, etc.) are configured to process data that is configured to be rendered in substantial real-time on a display screen. Broadly speaking, implementations are described with reference to the display being of a head mounted display (HMD). However, in other implementations, the display may be of a second screen, a display of a portable device, a computer display, a display panel, a display of one or more remotely connected users (e.g., whom may be viewing content or sharing in an interactive experience), or the like.

FIG. 1 illustrates a system for interaction with a virtual environment via a head-mounted display (HMD), in accordance with implementations of the disclosure. An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space. For example, the user may see a three-dimensional (3D) view of the virtual space when facing in a given direction, and when the user turns to a side and thereby turns the HMD likewise, then the view to that side in the virtual space is rendered on the HMD. In the illustrated implementation, a user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user, and may also provide viewing with three-dimensional depth and perspective.

In the illustrated implementation, the HMD 102 is wirelessly connected to a computer 106. In other implementations, the HMD 102 is connected to the computer 106 through a wired connection. The computer 106 can be any general or special purpose computer known in the art, including but not limited to, a gaming console, personal computer, laptop, tablet computer, mobile device, cellular phone, tablet, thin client, set-top box, media streaming device, etc. In some implementations, the computer 106 can be configured to execute a video game, and output the video and audio from the video game for rendering by the HMD 102. In some implementations, the computer 106 is configured to execute any other type of interactive application that provides a virtual space/environment that can be viewed through an HMD. A transceiver 110 is configured to transmit (by wired connection or wireless connection) the video and audio from the video game to the HMD 102 for rendering thereon. The transceiver 110 includes a transmitter for transmission of data to the HMD 102, as well as a receiver for receiving data that is transmitted by the HMD 102.

In some implementations, the HMD 102 may also communicate with the computer through alternative mechanisms or channels, such as via a network 112 to which both the HMD 102 and the computer 106 are connected.

The user 100 may operate an interface object 104 to provide input for the video game. Additionally, a camera 108 can be configured to capture images of the interactive environment in which the user 100 is located. These captured images can be analyzed to determine the location and movements of the user 100, the HMD 102, and the interface object 104. In various implementations, the interface object 104 includes a light which can be tracked, and/or inertial sensor(s), to enable determination of the interface object's location and orientation and tracking of movements. In some implementations, the interface object 104 is a motion controller whose location/orientation is tracked. In some implementations, the interface object 104 is a glove interface that is further capable of detecting the pose of the user's hand, including the positions of individual fingers.

In some implementations, a magnetic source 116 is provided that emits a magnetic field to enable magnetic tracking of the HMD 102 and interface object 104. Magnetic sensors in the HMD 102 and the interface object 104 can be configured to detect the magnetic field (e.g. strength, orientation), and this information can be used to determine and track the location and/or orientation of the HMD 102 and the interface object 104.

In some implementations, the interface object 104 is tracked relative to the HMD 102. For example, the HMD 102 may include an externally facing camera that captures images including the interface object 104. The captured images can be analyzed to determine the location/orientation of the interface object 104 relative to the HMD 102, and using a known location/orientation of the HMD, so determine the location/orientation of the interface object 104 in the local environment.

The way the user interfaces with the virtual reality scene displayed in the HMD 102 can vary, and other interface devices in addition to interface object 104, can be used. For instance, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In some implementations, the computer 106 functions as a thin client in communication over a network 112 with a cloud gaming provider 114. In such an implementation, generally speaking, the cloud gaming provider 114 maintains and executes the video game being played by the user 102. The computer 106 transmits inputs from the HMD 102, the interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a haptic/vibration feedback command is provided to the interface object 104.

In some implementations, the HMD 102, interface object 104, and camera 108, may themselves be networked devices that connect to the network 112, for example to communicate with the cloud gaming provider 114. In some implementations, the computer 106 may be a local network device, such as a router, that does not otherwise perform video game processing, but which facilitates passage of network traffic. The connections to the network by the HMD 102, interface object 104, and camera 108 may be wired or wireless.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display, such as a monitor or television, that can be configured to render video and/or provide for display of an interactive scene or virtual environment in accordance with the present implementations.

Figure 2:
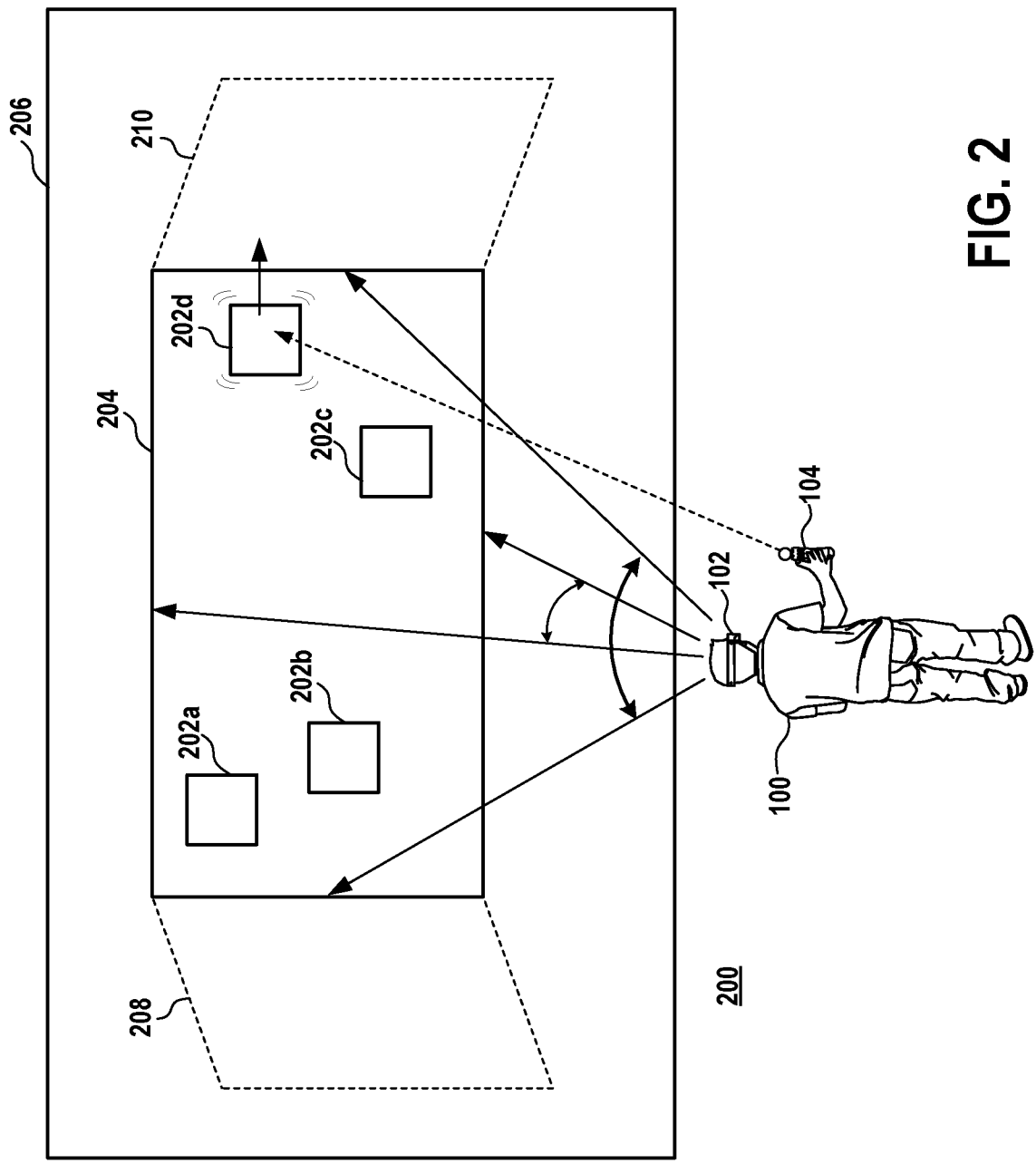
FIG. 2 conceptually illustrates a user 100 interacting in a virtual space to design a virtual reality user interface, in accordance with implementations of the disclosure.

FIG. 2 conceptually illustrates a user 100 interacting in a virtual space to design a virtual reality user interface, in accordance with implementations of the disclosure. Broadly speaking, a computing device (such as computer 106) executes an interface editor application that enables placement of user interface elements in the virtual space to define a virtual reality user interface for an interactive application (e.g. a video game or other application). The interface editor renders through the head-mounted display (HMD) 102 a view of the three-dimensional virtual space as shown in the illustrated implementation.

In some implementations, the interface editor can define a hierarchy of different zones that require increasing amounts of effort on the part of HMD user to access. For example, such zones may include a zone that encompasses the region of space that is comprehensible by a user when looking straight ahead, then a zone that is accessible by moving the eyes, then a zone that is accessible by moving the neck, then a zone that is accessible by moving the shoulders, etc. It will be appreciated that that zones may encompass regions that are accessible through any combination of the foregoing types of user movements. Broadly speaking, the interface editor can be configured to give hints to that help a user interface designer to maintain comfort when creating a virtual reality experience. For example, the interface editor may provide indicators of such zones in the virtual space in which the user interface is being designed.

With continued reference to FIG. 2, in the illustrated implementation, the interface editor is configured to enable placement of user interface elements 202a, 202b, 202c, and 202d in a virtual space 200. In some implementations, the interface editor is configured to define within the virtual space 200 a central zone 204 for placement of the user interface elements 202a-d. The central zone 204 may correspond to a comfort zone as defined above, e.g. a zone that is accessible by moving the eyes and/or turning the head within a predefined extent. The central zone 204 can be defined with reference to the forward direction of a future user of the interactive application that is to be generated. That is, the central zone 204 is at a front-facing direction from a viewpoint in the virtual space from which a user of the interactive application will view the virtual reality user interface when interacting with the interactive application. In some implementations, the designer user 100 is configured so as to be situated in approximately the same location in the virtual space 200 and have approximately the same reference orientation (e.g. which way is forward/front-facing for the user, and/or a default starting orientation in the virtual space)

The interface editor may further define a lateral zone 206 that is adjacent to the central zone 204. In some implementations, the lateral zone 206 includes one or more regions of the virtual space that are adjacent to the central zone 204.

As noted, the interface editor enables the user 100 to control the placement of the user interface elements. In some implementations, this is facilitated using input from a controller device 104 or other interface object (e.g. motion controller, mouse, trackball, touchscreen, stylus/tablet, touchpad, etc.). For example, movement of the controller device 104 can be detected/tracked and used to control movement of the user interface element 202d in the illustrated implementation. In some implementations, input can be provided via a specific input device of the controller device 104, such as a joystick, touchpad, trackball, buttons, directional pad, etc. In some implementations, gestures such as hand movements can be detected and used in a similar manner to control movement of user interface elements in the virtual space.

In the illustrated implementation, the user 100 is controlling the movement of the user interface element 202d using controller device 104 and attempting to drag the user interface element 202d from the central zone 204 to the lateral zone 206. For example, the pointing direction of the controller device 104 may constitute input to control the positioning of the user interface element 202d, such that the location of the user interface element 202d tracks the pointing direction of the controller device 104 (e.g. where the controller device 104 points in the virtual space is where the user interface element 202d is positioned).

However, in some implementations, when the interface editor detects input indicating an attempt to move a given user interface element from the central zone 204 to the lateral zone 206, then the interface editor generates a counteractive response that opposes or resists the attempt to move the given user interface element from the central zone to the lateral zone. As shown, the pointing direction of the controller device 104 is moving from the central zone 204 to the lateral zone 206 and therefore indicates an attempt to move the user interface element 202d out of the comfort zone defined by the central zone 204.

Therefore, in order to promote virtual reality design that prioritizes interface user comfort, the interface editor can be configured to provide a counteractive response which may include various types of actions. In some implementations, the user interface element 202d stops at the boundary between the central zone 204 and the lateral zone 206, notwithstanding the attempt to drag the user interface element 202d across the boundary. That is, as the pointing direction of the controller device 104 moves from the central zone 204 to the lateral zone 206, the user interface element 202d moves to the boundary but does not cross the boundary, even as the pointing direction does cross the boundary. In some implementations, the user interface element 202d does not cross the boundary until the input exceeds a predefined threshold, such a threshold time or intended movement of the user interface element. For example, the user interface element 202d may be maintained in the central zone 204 until the pointing direction of the controller device 104 is moved out of the central zone 204 for a predefined threshold amount of time and/or is moved across the boundary by a predefined threshold distance, whereupon the user interface element 202d returns to the positioning of the current pointing direction of the controller device 104. In some implementations, the user interface element 202d crosses the boundary in response to other secondary inputs/triggers such as an override gesture (e.g. detected via the controller device 104), button press or voice command.

In a related implementation, the zones such as central zone 204 and lateral zone 206 can be configured so that user interface elements "snap to" and/or exhibit "rubber banding" to the zones. For example, the user interface elements can be selected and moved, but may settle into one of the zones in a prescribed manner when released. For example, if a given user interface element is on the border of a zone or within a predefined distance of a zone, the user interface element may automatically move into the zone when released.

In some implementations, a given zone may have a predefined layout, such that user interface elements are automatically positioned at predefined placement locations within the layout. For example, the predefined layout may be configured as a grid layout to arrange user interface elements at regularly spaced intervals.

In some implementations, when an attempt to move a user interface element out of a zone is detected, the interface editor can be configured to generate a notification in response, to alert the user 100 to the fact that the user interface element is being moved out of the zone. Examples of notifications include a visual notification rendered in the virtual space, an audio notification, and/or a haptic/tactile feedback notification. Examples of visual notifications may include, by way of example without limitation, a pop-up dialogue (e.g. asking user 100 to confirm movement out of comfort zone), animation of the user interface element (e.g. vibration, shaking, pulsing, rotation, etc.), highlighting of comfort zone boundaries, etc. In some implementations, an audio notification can be a sound or spoken audio indicating the movement out of the comfort zone. In some implementations, haptic/tactile feedback notification such as a vibration/pulse can be provided through the controller device 104. It will be appreciated that with reference to the illustrated implementation, such a notification is thereby spatially dependent upon the movements of the controller device 104 that affect its pointing direction, for when the pointing direction of the controller device moves across the boundary of a zone, then the haptic/tactile feedback is generated.

In some implementations, zone boundaries are visible in the virtual space when using the interface editor. This can provide an indication to the user 100 of where a comfort zone is defined in the virtual space, thus enabling the user 100 to decide whether and to what extent they may wish to position user interface elements within or beyond a given zone, and thereby controlling the amount of effort required on the part of the application user to view/access a given user interface element.

In some implementations, the zones are defined as planar surfaces in the virtual space on which user interface elements are positioned. In some implementations, such planar surfaces are configured to be approximately perpendicular/orthogonal to the view direction of the user. That is, at least a portion of the planar surface is orthogonal to the view direction when the user is viewing the planar surface (e.g. the center portion of the planar surface). For example, in some implementations, a central portion of the central zone 204 is orthogonal to the view direction of the user 100 when the user 100 is viewing the central portion. Similarly, there may be additional adjacent zones 208 and 210, which are configured so that central portions of zones 208 and 210 are perpendicular to the view direction of the user 100 when viewing such central portions.

In some implementations, at least some of the planar surfaces are not orthogonal to the view direction of the user.

In some implementations, the zones are defined as other types of surfaces that are not specifically planar, such as curved surfaces or spherical surfaces. In some implementations, a zone having a curved or spherical surface is configured to be approximately perpendicular or orthogonal to the view direction of the user. That is, at least a portion of the curved surface is orthogonal to the view direction when the user is viewing the curved surface (e.g. the center portion of the curved surface).

It will be appreciated that while the zones may be defined as surfaces along which the user interface elements are arranged, such user interface elements can be planar/two-dimensional objects or three-dimensional objects. In some implementations, when user interface elements are specifically restricted to being positioned along such surfaces, then the pointing direction referenced above that intersects a given surface can control the positioning of a given user interface element on the given surface when the given user interface element is being guided by the controller device 104.

While in some implementations, the comfort zones are surfaces along which user interface elements are arranged, in other implementations, the comfort zones can be three-dimensional regions of the virtual space. User interface elements can be positioned both laterally and at variable depth within such zones.

Figure 3A:
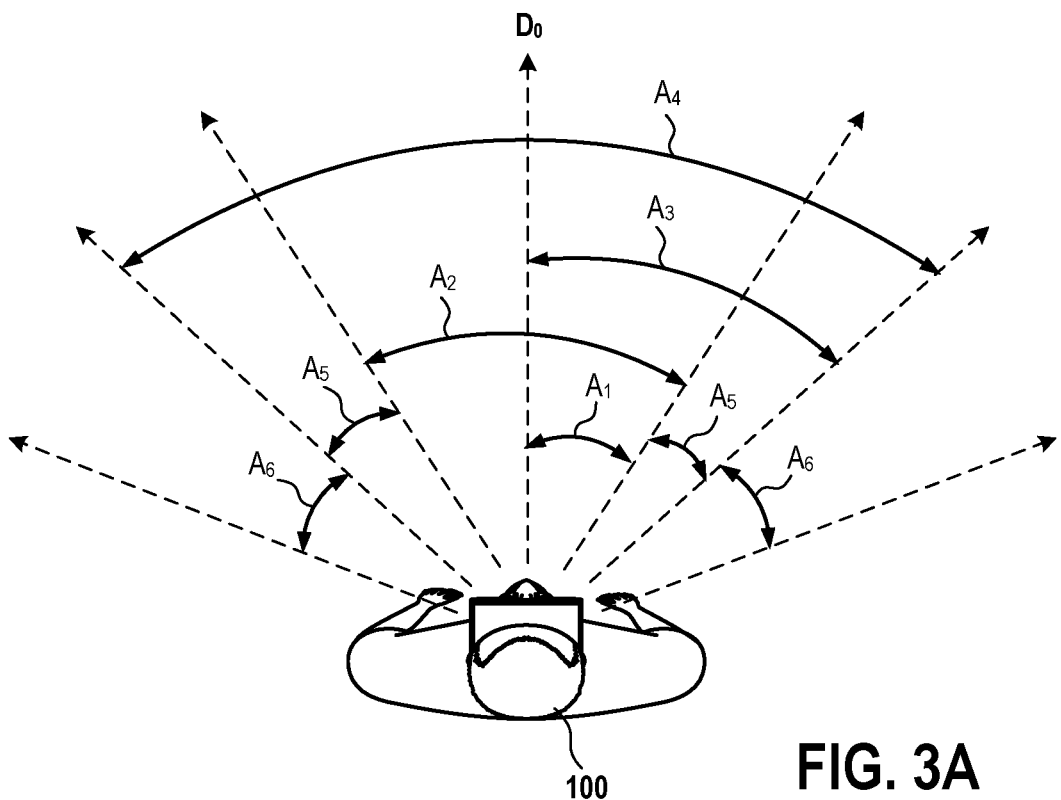
FIG. 3A illustrates an overhead view of a user 100, demonstrating various horizontal extents for comfort zones, in accordance with implementations of the disclosure.

FIG. 3A illustrates an overhead view of a user 100, demonstrating various horizontal extents for comfort zones, in accordance with implementations of the disclosure. The user 100 is shown in an initial forward-facing orientation, having a view direction $D_0$. A first comfort zone may be defined based on a comfortable range of eye rotation for an average user. For example, if an average user has a comfortable maximum horizontal eye rotation angle of $A_1$ (deviating from the forward view direction $D_0$), then the first comfort zone is defined by the region of the virtual space that is viewable by such horizontal eye rotation alone—that is, the region of the virtual space encompassed by the angular amount $A_1$ to the left and right of the forward view direction $D_0$. This is shown by the angle $A_2$ in the illustrated implementation. In some implementations, the maximum comfortable horizontal eye rotation angle is approximately 30 degrees; in some implementations, approximately in the range of 25 to 35 degrees; and in some implementations, approximately in the range of 20 to 40 degrees.

In some implementations, a second comfort zone is defined by the extent to which a user comfortably turns their head. In the illustrated implementation, an average user may have a maximum comfortable head rotation angle $A_3$ (deviating from forward view direction $D_0$). And thus, a comfort zone can be defined encompassing a horizontal angle $A_4$, that is a region viewable by head rotation alone to the left and right of the forward view direction $D_0$ by the angular amount $A_3$. In some implementations, the maximum comfortable horizontal head rotation angle $A_3$ is approximately 45 degrees; in some implementations, in the range of approximately 40 to 50 degrees; in some implementations, in the range of approximately 35 to 55 degrees. It will be appreciated that the horizontal angles described herein can be considered to have a vertex that is approximately located at the location and/or the viewpoint of the user or axis of rotation of the user's head.

In some implementations, a comfort zone is defined by the additional region of the virtual space that is accessible by a given user action over that which is accessible through another user action. For example, a comfort zone may be defined as the region viewable through maximum comfortable head rotation alone that is additional to the region viewable through maximum comfortable eye rotation alone. In the illustrated implementation, this is defined by the regions encompassed by the horizontal angles $A_5$.

In some implementations, a comfort zone can be defined based on the region that is viewable by eye rotation in addition to head rotation. For example, in some implementations, a comfort zone is defined as the region viewable by a combination of maximum comfortable head rotation and maximum comfortable eye rotation. In some implementations, a comfort zone is defined as the region viewable by the combination of maximum comfortable head and eye rotation over that which is viewable by maximum comfortable eye rotation alone.

In some implementations, a comfort zone is defined as the region viewable by the combination of maximum comfortable head and eye rotation over that which is viewable by maximum comfortable head rotation alone. In the illustrated implementation, this includes the regions encompassed by the horizontal angles $A_6$, which may be the same angle as the maximum comfortable eye rotation angle $A_1$.

In addition to comfort zones defined based on eye and/or head rotation, comfort zones be further defined based on rotation of additional body portions of the user, such as shoulder or torso rotation, hip rotation, etc. It will be appreciated that comfort zones may be defined based on regions that are viewable through maximum comfortable rotation of any body portion or any combination of body portions. Furthermore, comfort zones can be defined based on any difference in such viewable regions.

Figure 3B:
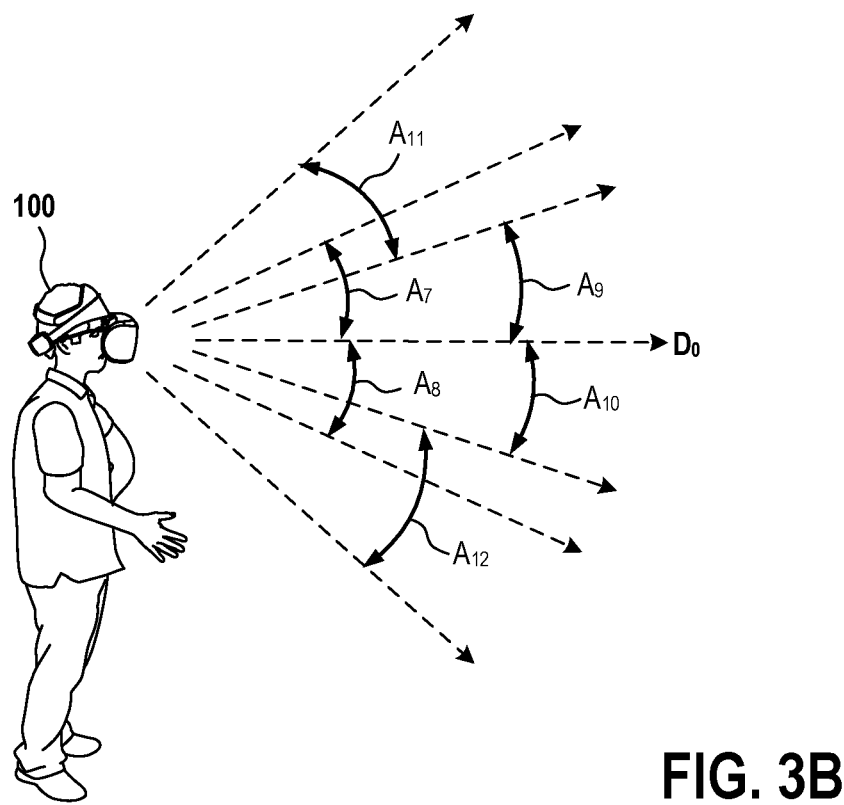
FIG. 3B illustrates comfort zones established based on maximum comfortable vertical rotation of various body portions of a user, in accordance with implementations of the disclosure.

While comfort zones have been described above with reference to maximum comfortable horizontal rotation amounts, FIG. 3B illustrates comfort zones established based on maximum comfortable vertical rotation of various body portions of a user, in accordance with implementations of the disclosure. In the illustrated implementation, a side view of the user 100 is shown. The view direction $D_0$ illustrates a normal initial neutral forward viewing direction.

In some implementations, comfort zones can be defined based on vertical rotation of the user's eyes alone. For example, in some implementations, a comfort zone is defined by the maximum comfortable upward rotation of the user's eyes and the maximum comfortable downward rotation of the user's eyes. It will be appreciated that these values may differ, as it is typically more strenuous to rotate the eyes upward than downward. In the illustrated implementation, the user 100 has a maximum comfortable upward rotation of the eyes indicated by the angle $A_7$, and a maximum comfortable downward rotation of the eyes indicated by the angle $A_8$. In some implementations, a comfort zone is defined based on the region of the virtual space encompassed by the angles $A_7$ and $A_8$ (i.e. viewable by the user 100 when the eyes are rotated throughout this angular range). In some implementations, the angle $A_7$ is approximately 25 degrees; in some implementations, in the range of approximately 20 to 30 degrees; in some implementations, in the range of approximately 15 to 35 degrees. In some implementations, the angle $A_8$ is approximately 35 degrees; in some implementations, in the range of approximately 30 to 40 degrees; in some implementations, in the range of approximately 25 to 45 degrees.

In some implementations, comfort zones are defined based on comfortable vertical rotation (tilting) of the user's head. For example, in the illustrated implementation, the user 100 may have a maximum comfortable upward head rotation shown by the angle $A_9$, and a maximum comfortable downward head rotation shown by the angle $A_{10}$. In some implementations, the angle $A_9$ is approximately 15 degrees; in some implementations, in the range of approximately 10 to 20 degrees; in some implementations, in the range of approximately 5 to 25 degrees. In some implementations, the angle $A_{10}$ is similar to or the same as the angle $A_9$. Comfort zones may be defined based on the region of the virtual space encompassed by such angular ranges.

Furthermore, comfort zones may be defined based on the combination of comfortable vertical head rotation (tilting) and comfortable vertical eye rotation. In the illustrated implementation, the maximum comfortable upward eye rotation is shown by the angle $A_{11}$ in addition to the maximum comfortable upward head rotation (shown by angle $A_9$). And the maximum comfortable downward eye rotation is shown by the angle $A_{12}$ in addition to the maximum comfortable downward head rotation (shown by angle $A_{10}$). The region of the virtual space encompassed by these angular ranges may be used to define comfort zones, taken alone or by extension from, or subtraction from, other comfort zones.

Figure 4:
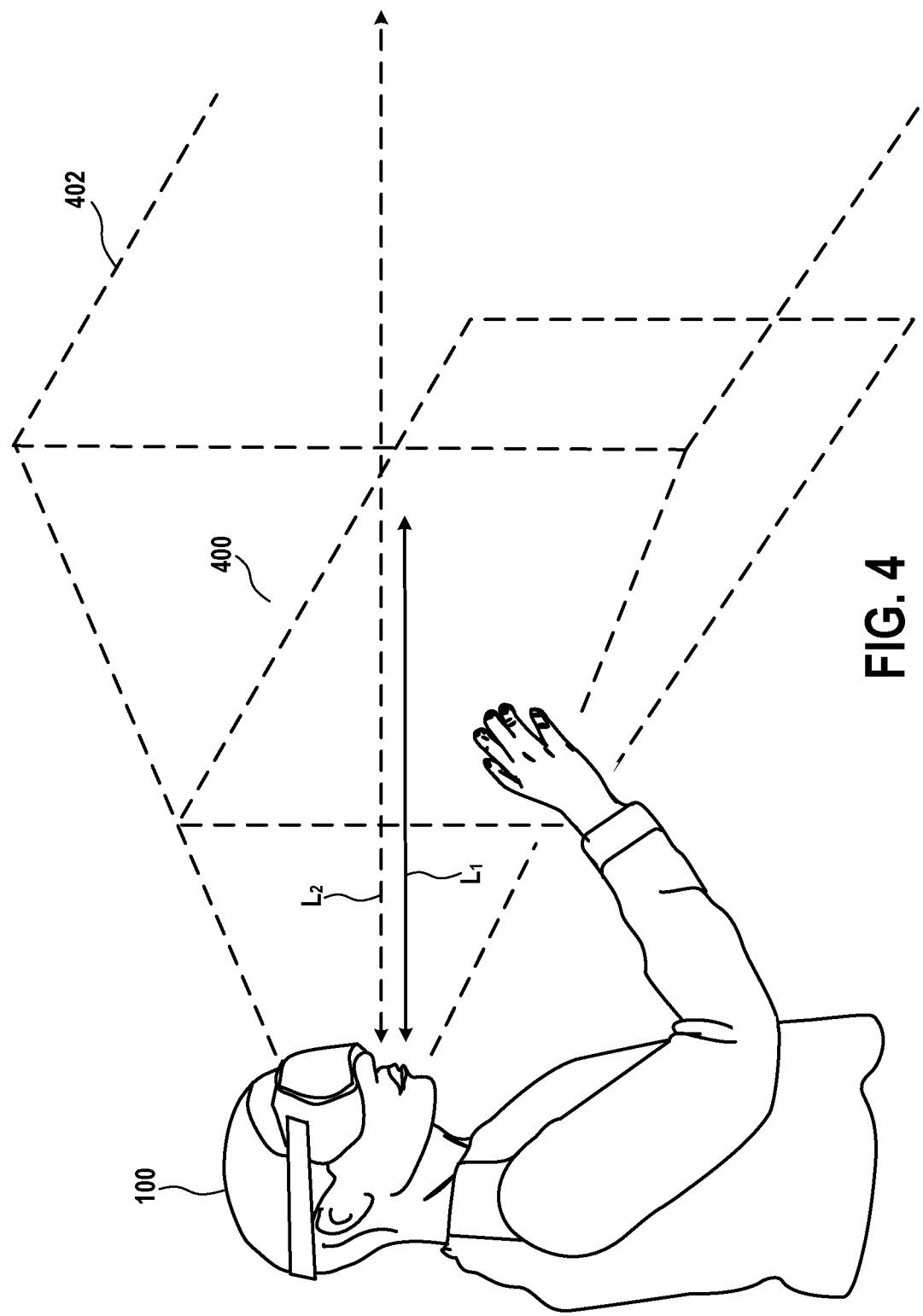
FIG. 4 illustrates a user in relation to comfort zones set at different distances from the user in a virtual space, in accordance with implementations of the disclosure.

In some implementations, the distance of user interface elements from the user 100 is a consideration. FIG. 4 illustrates a user in relation to comfort zones set at different distances from the user in a virtual space, in accordance with implementations of the disclosure. In some implementations, a designer may wish to set user interface elements within a comfortable arm's reach of the user, so that the user may interact with the user interface elements by virtually touching or manipulating them with their hands. Therefore, in the illustrated implementation, a comfort zone 400 can be configured to be at a distance $L_1$ from the user 100, the distance $L_1$ being a comfortable distance for a user to be able to reach a user interface element in the comfort zone 400. As with other previously described zones, the behavior of a user interface element may be guided by the interface editor, such as snapping to the distance set by the comfort zone 400, warning the user if they are moving a user interface element beyond the comfortable reach distance $L_1$, etc.

Though the comfort zone 400 is illustrated as a planar surface, it will be appreciated that in other implementations the comfort zone 400 can be defined as a region of the virtual space including a range of distances from the user 100. For example, in some implementations, the distance $L_1$ of the comfort zone 400 defines a distance range from the user 100 that is configured to be within a comfortable arm's reach of the user 100. In some implementations, user interface elements may snap to this distance range, and a user 100 may receive notification when attempting to move a user interface element out of the distance range. It will be appreciated that such a distance range defines both a maximum comfortable reach distance, as well as a minimum comfortable reach distance, as it is recognized that user interface elements that are too close to the user may also be uncomfortable to reach and may also be uncomfortable to view due to their close proximity to the user.

It will be appreciated that various factors may influence the specific distance value or distance range that is comfortable to reach, including by way of example without limitation, height of the user, age, gender, arm length, body position (e.g. seated or standing position), the specific HMD and/or tracking system utilized, specific input devices, use of glasses or bifocals (which may limit the user's eye rotation), etc. It will be appreciated that an interface editor can be configured to consider any of such factors and automatically set the distance value/range $L_1$ accordingly. For example, the designer may enter such information about the intended user of the user interface and the interface editor may calculate and provide the appropriate distance value/range. In some implementations, the designer may enter a target age or age range, and the interface editor may utilize corresponding data of average comfortable reach for the given target age or age range, and set the distance value/range $L_1$ accordingly.

In some implementations, the distance value/range $L_1$ is approximately 0.5 meters; in some implementations, in the range of about 0.4 to 0.6 meters; in some implementations, in the range of about 0.3 to 0.7 meters.

With continued reference to FIG. 4, also shown is a more distant zone 402 that is specifically configured to be well beyond the reach of the user 100. It is recognized that it may be undesirable to place user interface elements at distances that are just out of reach of the user, as the user may still attempt to reach a user interface element that is so placed. And thus it may be preferable to place user interface elements either within comfortable reach of the user, or at sufficient distance to be easily recognizable by the user as being out of reach, so that the user will not attempt to reach out and touch a user interface element unless it is actually reachable. In the illustrated implementation, the zone 402 is configured at a distance (or distance range) $L_2$ that is sufficiently beyond the reach of the user as described. In some implementations, the interface editor can be configured so that a user interface element being placed in the virtual space will snap to either of the zones 400 or 402 (e.g. the user interface element will automatically be placed in the zone that is closest to where it is released into the virtual space, but can also be forced to be placed elsewhere, for example in response to persistent user input as described above).

In some implementations, the interface editor is configured to automatically adjust the size of a user interface element based on its distance from the user 100. In some implementations, as the distance of the user interface element from the user increases, so the size of the user interface element is increased; conversely, as the distance of the user interface element from the user decreases, so the size of the user interface element is reduced. In conjunction with the automatic behavior of snapping to comfort zones as described above, the size of the user interface elements may snap to specific size/zoom levels that are associated with the specific zones. This can facilitate more pleasing layouts. For example, if user interface elements are brought forward to a nearer comfort zone, then their size can be reduced so as to avoid unpleasant crowding of the user interface elements. In some implementations, it is also possible to define the size as an arc/angle within the field of view. For instance, an item may be defined to occupy 0.5 degrees (by way of example without limitation) of the field of view. The system would then resize the item according to distance so as to fulfill its arc/angular size.

In some implementations, the interface editor may have a user size setting that the designer may adjust to cause the interface editor to automatically specify the comfort zone based on the this user size setting. For example, for a smaller user size setting, the distance of the comfort zone may be closer to the user, the user interface elements may be packed closer together (more densely positioned), and/or the size of the user interface elements may be decreased. Conversely for a larger user size setting, the distance of the comfort zone may be further from the user, the user interface elements may be packed further from each other (less densely positioned), and/or the size of the user interface elements may be increased.

Figure 5:
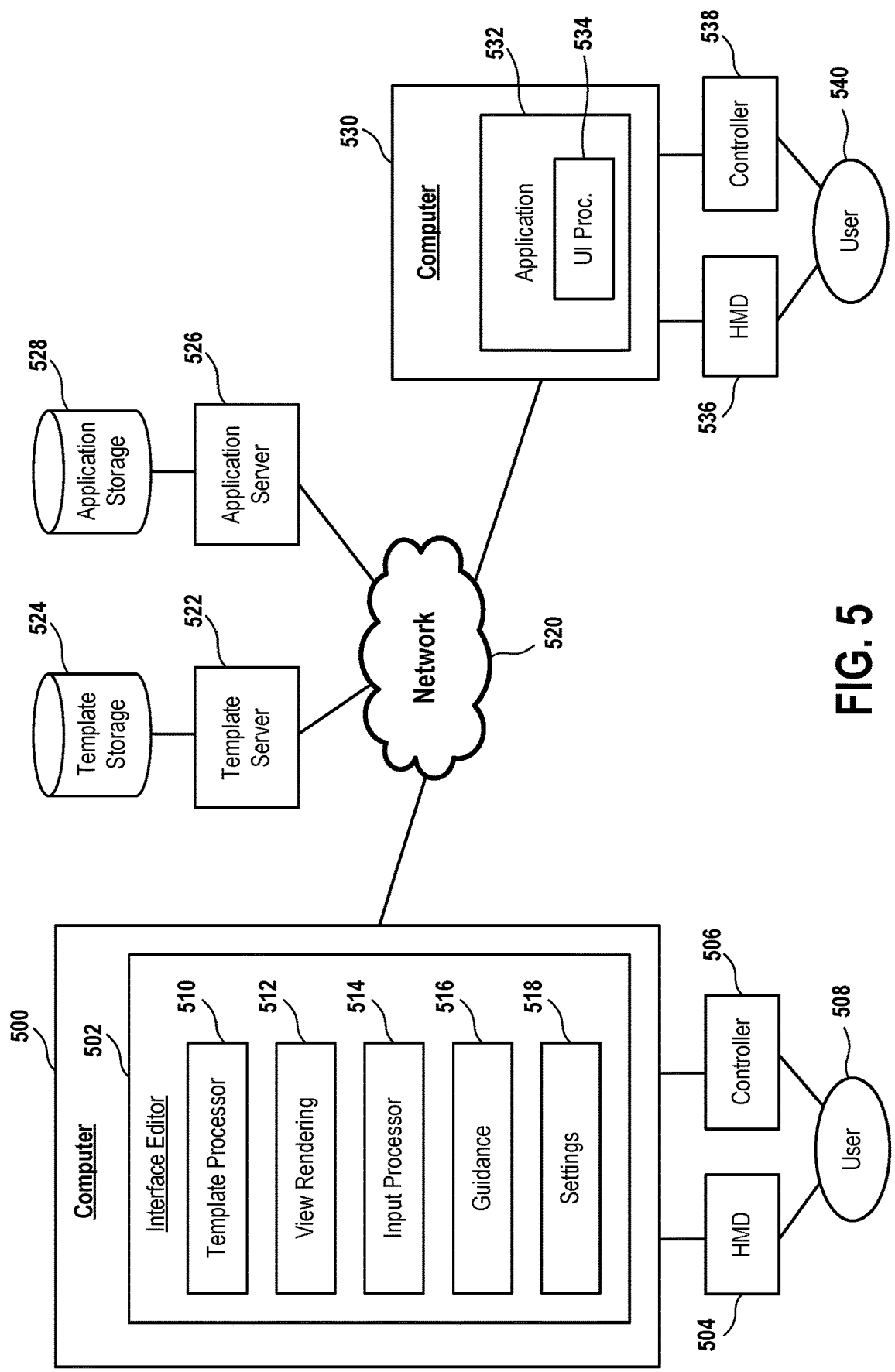
FIG. 5 illustrates a system for designing a virtual reality user interface, in accordance with implementations of the disclosure.

FIG. 5 illustrates a system for designing a virtual reality user interface, in accordance with implementations of the disclosure. A computer 500 executes an interface editor 502, which is an application that enables creation/editing of a user interface for a virtual reality application. It is useful to create user interfaces for virtual reality while in virtual reality, and thus, the interface editor 502 is configured to render a view of a virtual space to an HMD 504 worn by a (designer) user 508. The user 508 may further interact with the interface editor in the virtual space using an input device such as a controller device 506.

In some implementations, the interface editor 502 utilizes templates that define comfort zones for a virtual space. A template can define a particular arrangement of comfort zones, and may further specify the behavior of user interface elements in relation to the comfort zones, such as snapping to zones and automatic size adjustment. The interface editor 502 includes a template processor 510 that loads templates from a storage. In some implementations, templates are stored locally (e.g. at the computer 500). In some implementations, templates are stored remotely. For example, templates may be obtained by the interface editor 502 over a network 520 from a template server 522 that retrieves templates from a template storage 524.

A view rendering component 512 of the interface editor 502 is configured to render the correct view of the virtual space for display on the HMD 504, as such view changes in real-time based on the movements of the HMD 504 that are initiated by the user 508. An input processor 514 is configured to receive input from the controller device 506 and apply such input for user interface editing purposes, such as to manipulate a user interface element in the virtual space.

The interface editor 502 includes a guidance component 516 that is configured to provide guidance to the user 508 to promote design of the user interface for user comfort in virtual reality. This can include guidance behaviors such as the aforementioned snapping to comfort zones and notifications when crossing zone boundaries. A settings component 518 is configured to handle settings for comfort zones and user interface element behavior, such as specific dimensions and geometry of comfort zones, intended user information, user interface element behavior (e.g. resizing based on distance from user, etc.), etc.

It will be appreciated that the interface editor 502 enables the design of the user interface for an interactive virtual reality application such as a video game. In the illustrated implementation, such an application 532 is executed by a computer 530. In some implementations, the application is stored to an application storage 528 and distributed by an application server 526. For example, the application may be downloaded over the network to the computer 530. In some implementations, the application is cloud executed by the application server 526, though in the illustrated implementation, the application 532 is locally executed by the computer 530.

It will be appreciated that the interactive application 532 generates a user interface in a virtual space as designed using the interface editor 502. Such a user interface can thus be optimized to provide for comfortable viewing and interaction. The view of the virtual space is rendered to an HMD 536 worn by a user 540. Additionally, the user 540 may interact in the virtual space using a controller device 538.

While implementations of the disclosure have been described in relation to an interface editor for designing the user interface in a virtual space. The functionality of the interface editor can be as an application, a plugin or component of an application, etc. Additionally, in some implementations, at least some of the functionality for user interface design and editing as described above can be performed by the application 532 itself. For example, the application 532 may include a user interface processing component 534, which is a plugin or module or component (e.g. game engine plugin/module) that provides for modification and customization of the virtual space user interface.

In some implementations, the user interface can be scaled to the size of the person using it. For example, the user interface can be adjusted to be closer or further, wider or narrower, larger or smaller, etc., as users may have different preferences for reach and turning, zoom, etc. In some implementations, a slider or dial or other mechanism can be adjusted to cause user interface elements such as icons to be further and more spread or closer and more tightly packed in.

By way of example, if the user is playing a racing game and the vehicle controls (e.g. steering wheel, shifter, etc.) is too far away, the user may activate the settings and adjust the user interface setting to move the vehicle controls closer. In some implementations, the user interface processing component 534 may show different areas or possibilities for placement of the controls, allowing the user to pick one. In some implementations, the system could show different possible positions for a given element of the user interface, and after the user picks one, other elements in the user interface are positioned/scaled accordingly.

In some implementations, adjustment of placement of user interface elements can be effected via voice control, including recognized voice commands that adjust the user interface.

Broadly speaking, implementations of the present disclosure provide for a design tool that allows visualization of different combinations of user interface design, including adjustment of placement and scale. In some implementations, the sizes and/or placement are scaled in accordance with adjustments made to comfort zones and/or user interface elements.

In some implementations, a user in virtual reality may spawn an item by ray-casting it to the desired distance zone. In some implementations, the system may ray-cast a planar canvas that is orthogonal to the view direction, on which user interface elements can be arranged.

It will be appreciated that user interface elements can be any type of virtual element or virtual object with which a user in virtual reality may interact. By way of example without limitation, user interface elements can include any of various icons, buttons, labels, text boxes, menu items, art assets, two-dimensional objects, three-dimensional objects, control elements, settings controls, etc.

In some implementations, certain user interface elements can be configured to exhibit distance-dependent behavior whereas others may not exhibit such behavior. For example, when the user interface is re-scaled, some elements may be repositioned/scaled, whereas other elements are not repositioned/scaled. In some implementations, a template may define which elements or types/classes of elements exhibit distance-dependent behavior, and elements may be filtered accordingly when changes are made causing distance-dependent behaviors to be effected.

While various comfort zones have been defined with respect to reachability and visibility based on eye/head/body rotation, another issue is the legibility of any text that is included in/on an object. For example, when objects are placed at increased distances or towards the periphery of zones with respect to rotation, then text may become more difficult to read. Thus, in some implementations, the behavior of an object with respect to is textual content may change in response to its placement. For instance, a button placed at a closer/nearby distance to the user may use a text label, whereas a button placed at a more distant location may switch over to an icon as a representation as the text may become illegible to a user at such a distant location. In some implementations, the size of text relative to the object to which it pertains increases as the placement of the object increases in distance from the user. In some implementations, text may be removed or not displayed when placement of the object is at a distance greater than a predefined threshold.

In some implementations, the interface editor may further promote the visibility of objects (and legibility of text) by analyzing aspects such as color and contrast with other elements, and notifying the user of potential issues and/or suggesting changes. For example, the interface editor may analyze the contrast of elements or legibility of text based at least in part on what is in the background. When poor visibility/legibility is detected, the system may encourage workarounds in such cases, for example by suggesting/including a border for elements to increase contrast, suggesting alternative colored versions of the same elements, suggesting different forms of elements that do not suffer from the contextual placement issues, etc. In some implementations, the system may discourage the placement of objects when their visibility would be compromised to those with color blindness. For example, the system may discourage placement of red objects where they would be visible on a green background to accommodate people with red-green color blindness. This could be another profile option (such as age, gender, body position) that would be loaded to configure the zones.

It is further recognized that in some implementations, VR content that is being viewed through an HMD may be shared with a second screen, for example, so that another user may spectate the activity of the VR user. In some implementations, the interface editor defines ranges within the comfort zones of objects that correspond to the field of view of the second screen, since the second screen may be a more restricted (or less restricted) field of view than the one within the HMD. This facilitates placement of elements so that they can more likely (or less likely) be visible on one screen or the other.

It is recognized that comfort zones may differ for different people, as individuals may have different preferences regarding what they consider to be comfortable. In some implementations, an interface editor or application can be configured to provide different options for comfort zones, which may be according to different predefined templates. In some implementations, the extent for a comfort zone can be determined through user input. For example, the user can be asked to turn their head comfortably to the left and right, and the extent to which the user turns their head can be used as input to determine a comfort zone (e.g. amount the head is turned defines the angular extent of the comfort zone, or average of left and right head turn are used to define angle of both sides). In a similar manner, a comfortable extent of eye movement can be determined using gaze tracking in the HMD.

In some implementations, the interface editor is configured so that a layout may not snap to comfort zones. However, the layout can be scored, indicating how well the user's layout adheres to the comfort zones. Additionally, the interface editor may show the user how to improve the layout, for example by indicating suggested changes to the layout (e.g. repositioning and/or resizing of user interface elements). In some implementations, an optimization function can be implemented to automatically suggest and/or make changes to a given layout so as to optimize the layout for user comfort (e.g. by positioning and resizing user interface elements within comfort zones).

In some implementations, comfort zones and templates may be defined and evolved, at least in part, using crowd-sourced data about how users are using a given user interface. For example, in some implementations, the comfort zone boundaries are defined from crowd-sourced data. In some implementations, user settings and preferences regarding user interface configurations can be provided as feedback data to evolve the templates. For example, popular settings/values can be indicated by the interface editor, and may be used to define template settings. In some implementations, user customization can be visualized in virtual reality as a heatmap. For example, the popularity of user-defined positioning and/or setting adjustment may be visualized in virtual reality using colors or light intensity or other visualization techniques.

While user interface element placement within certain comfort zones has been described, generally for purposes of making such user interface elements more comfortable to access, it is recognized that for some user interface elements, it may not be desirable to place them in easily accessible positions. For example, in a game involving a vehicle (e.g. plane, boat, car, spacecraft, etc.), it may be desirable to specifically place an eject button or self-destruct button in a location that is not easily accessible, so that the user does not accidentally trigger such an event. Therefore, in some implementations, certain types of elements may snap to zones that are less easily accessible.

Figures 1, 6A:
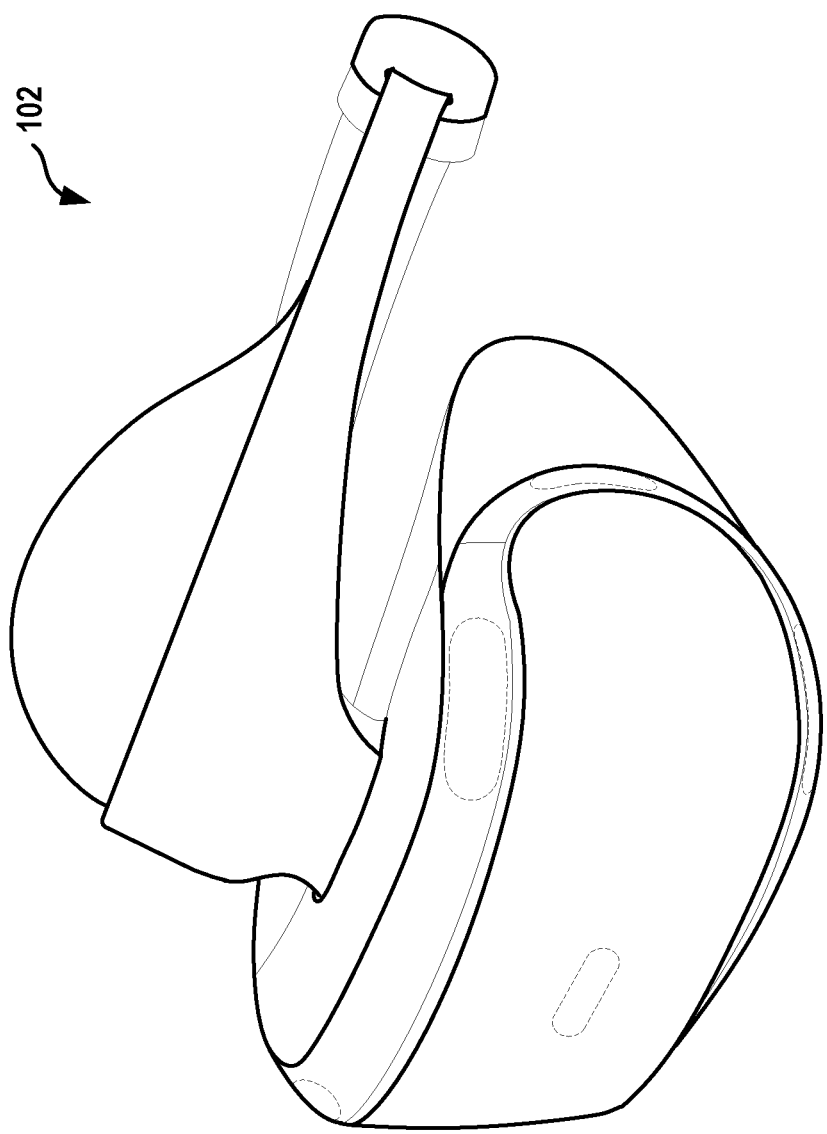
Figures 2, 6A:
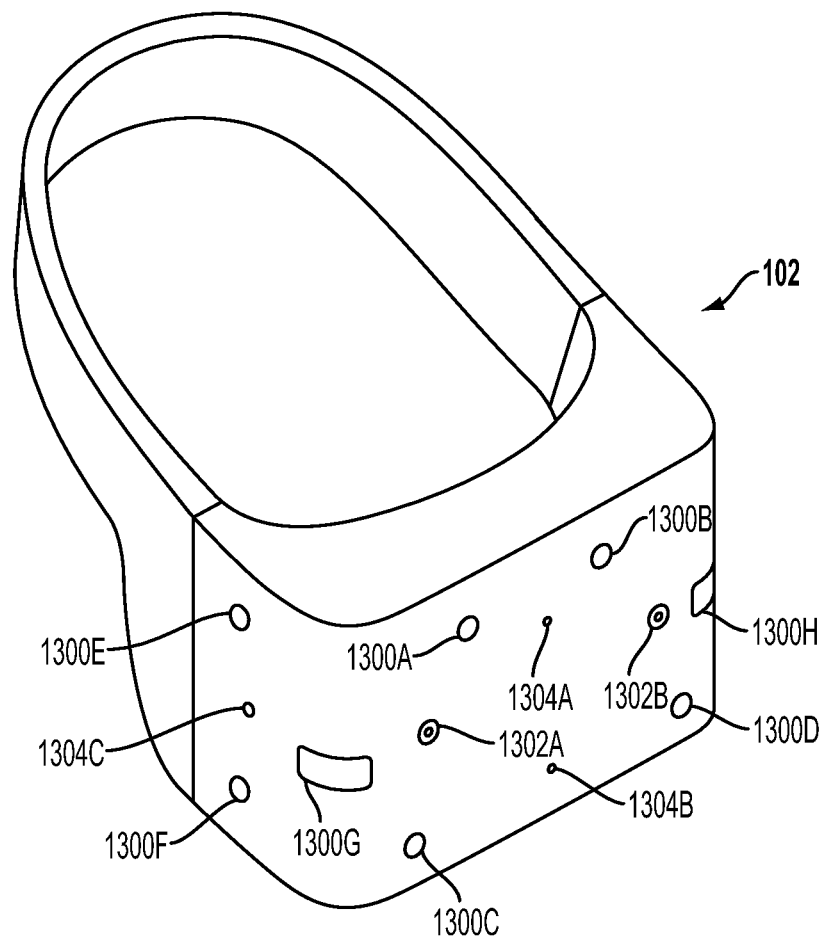

FIGS. 6A-1 and 6A-2 illustrate a head-mounted display (HMD), in accordance with an implementation of the disclosure. FIG. 6A-1 in particular illustrates the Playstation® VR headset, which is one example of a HMD in accordance with implementations of the disclosure. As shown, the HMD 102 includes a plurality of lights 1300A-H. Each of these lights may be configured to have specific shapes, and can be configured to have the same or different colors. The lights 1300A, 1300B, 1300C, and 1300D are arranged on the front surface of the HMD 102. The lights 1300E and 1300F are arranged on a side surface of the HMD 102. And the lights 1300G and 1300H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 1300G and 1300H) may be exposed for image capture depending upon the orientation of the HMD 102 relative to the image capture device.

In one implementation, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated implementation, the HMD 102 includes microphones 1304A and 1304B defined on the front surface of the HMD 102, and microphone 1304C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated implementation, the HMD 102 is shown to include image capture devices 1302A and 1302B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 1302A and 1302B (e.g., or one or more external facing (e.g. front facing) cameras disposed on the outside body of the HMD 102) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated implementation, two cameras are shown on the front surface of the HMD 102, it will be appreciated that there may be any number of externally facing cameras installed on the HMD 102, oriented in any direction. For example, in another implementation, there may be cameras mounted on the sides of the HMD 102 to provide additional panoramic image capture of the environment. Additionally, in some implementations, such externally facing cameras can be used to track other peripheral devices (e.g. controllers, etc.). That is, the location/orientation of a peripheral device relative to the HMD can be identified and tracked in captured images from such externally facing cameras on the HMD, and using the known location/orientation of the HMD in the local environment, then the true location/orientation of the peripheral device can be determined.

Figure 6B:
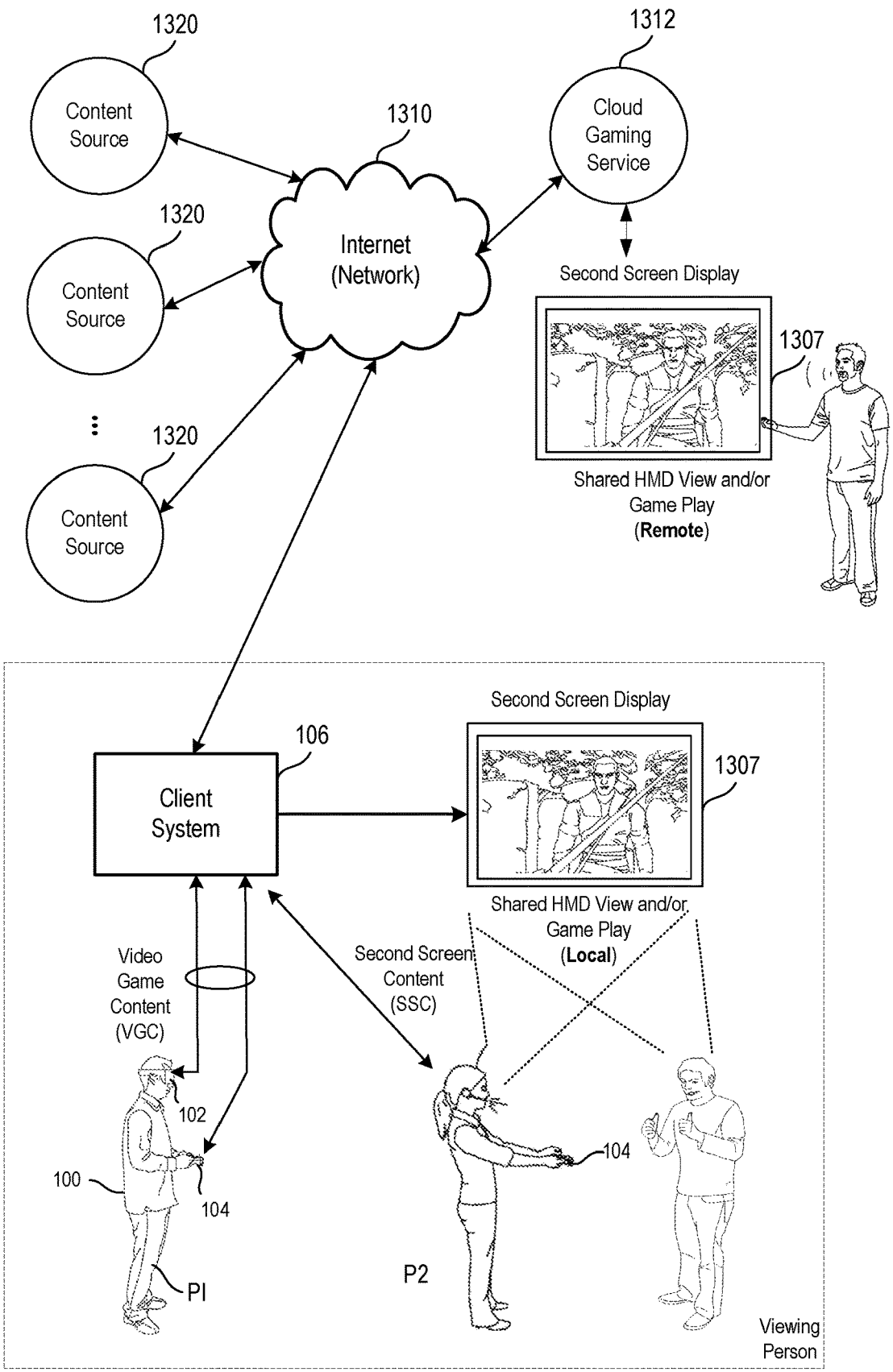
FIG. 6B illustrates one example of an HMD user interfacing with a client system, and the client system providing content to a second screen display, which is referred to as a second screen, in accordance with one implementation.

FIG. 6B illustrates one example of an HMD 102 user 100 interfacing with a client system 106, and the client system 106 providing content to a second screen display, which is referred to as a second screen 1307. The client system 106 may include integrated electronics for processing the sharing of content from the HMD 102 to the second screen 1307. Other implementations may include a separate device, module, connector, that will interface between the client system and each of the HMD 102 and the second screen 1307. In this general example, user 100 is wearing HMD 102 and is playing a video game using a controller, which may also be interface object 104. The interactive play by user 100 will produce video game content (VGC), which is displayed interactively to the HMD 102.

In one implementation, the content being displayed in the HMD 102 is shared to the second screen 1307. In one example, a person viewing the second screen 1307 can view the content being played interactively in the HMD 102 by user 100. In another implementation, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 1307 along with the VGC received from the HMD 102.

Accordingly, the interactivity by other users who may be co-located or remote from an HMD user can be social, interactive, and more immersive to both the HMD user and users that may be viewing the content played by the HMD user on a second screen 1307. As illustrated, the client system 106 can be connected to the Internet 1310. The Internet can also provide access to the client system 106 to content from various content sources 1320. The content sources 1320 can include any type of content that is accessible over the Internet.

Such content, without limitation, can include video content, movie content, streaming content, social media content, news content, friend content, advertisement content, etc. In one implementation, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one implementation receive the second screen content from one of the content sources 1320, or from a local user, or a remote user.

Figure 7:
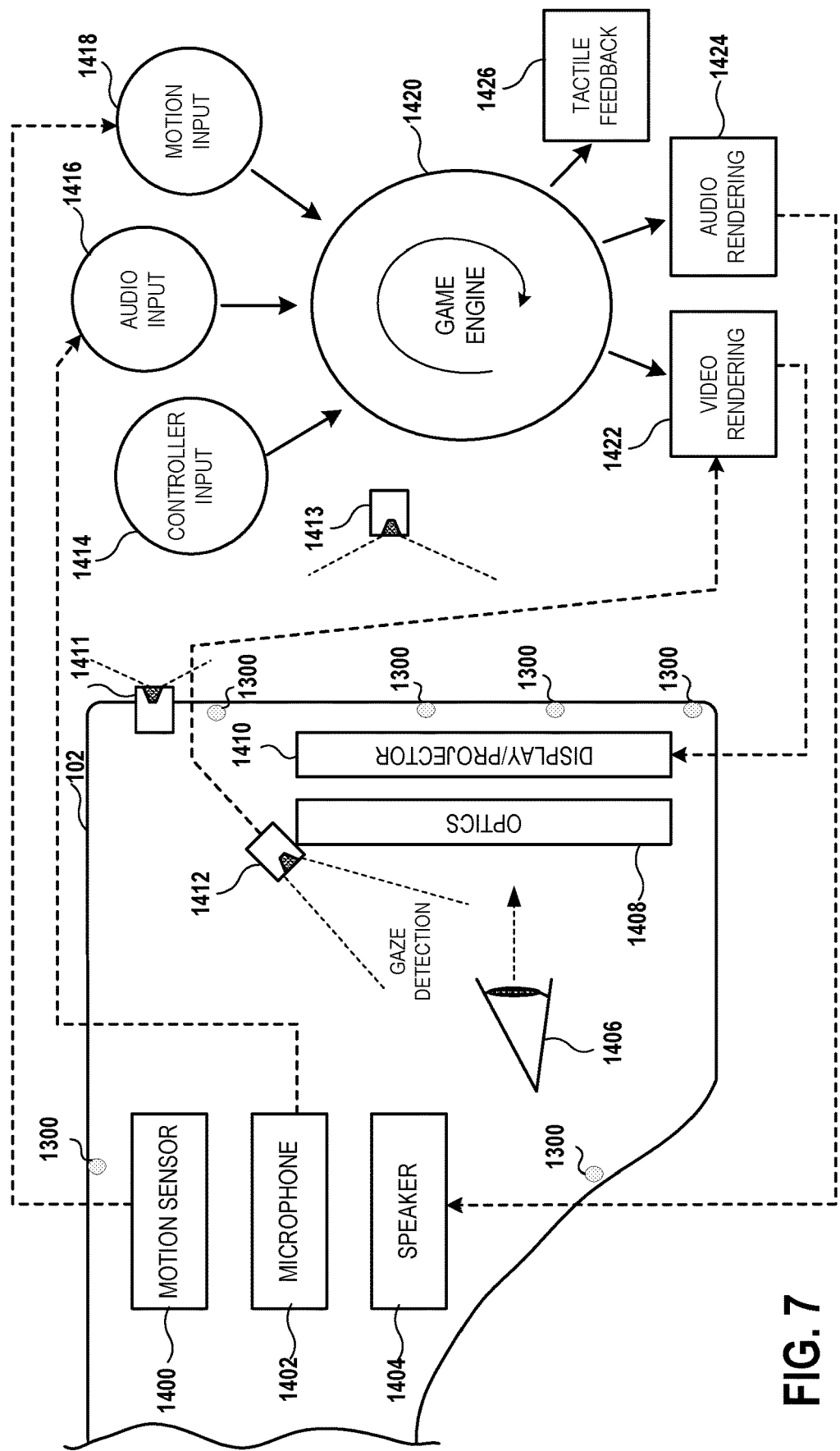
FIG. 7 conceptually illustrates the function of an HMD in conjunction with an executing video game, in accordance with an implementation of the disclosure.

FIG. 7 conceptually illustrates the function of the HMD 102 in conjunction with an executing video game or other application, in accordance with an implementation of the disclosure. The executing video game/application is defined by a game/application engine 1420 which receives inputs to update a game/application state of the video game/application. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated implementation, the game engine receives, by way of example, controller input 1414, audio input 1416 and motion input 1418. The controller input 1414 may be defined from the operation of a gaming controller separate from the HMD 102, such as a handheld gaming controller (e.g. Sony DUALSHOCK®4 wireless controller, Sony PlayStation® Move motion controller) or directional interface object 104. By way of example, controller input 1414 may include directional inputs, button presses, trigger activation, movements, gestures, or other kinds of inputs processed from the operation of a gaming controller. In some implementations, the movements of a gaming controller are tracked through an externally facing camera 1411 of the HMD 102, which provides the location/orientation of the gaming controller relative to the HMD 102. The audio input 1416 can be processed from a microphone 1402 of the HMD 102, or from a microphone included in the image capture device 1413 or elsewhere in the local environment. The motion input 1418 can be processed from a motion sensor 1400 included in the HMD 102, and/or from image capture device 1413 as it captures images of the HMD 102, and/or from externally facing camera 1411 of the HMD 102. The game engine 1420 receives inputs which are processed according to the configuration of the game engine to update the game state of the video game. The game engine 1420 outputs game state data to various rendering modules which process the game state data to define content which will be presented to the user.

In the illustrated implementation, a video rendering module 1422 is defined to render a video stream for presentation on the HMD 102. The video stream may be presented by a display/projector mechanism 1410, and viewed through optics 1408 by the eye 1406 of the user. An audio rendering module 1404 is configured to render an audio stream for listening by the user. In one implementation, the audio stream is output through a speaker 1404 associated with the HMD 102. It should be appreciated that speaker 1404 may take the form of an open air speaker, headphones, or any other kind of speaker capable of presenting audio.

In one implementation, a gaze tracking camera 1412 is included in the HMD 102 to enable tracking of the gaze of the user. The gaze tracking camera captures images of the user's eyes, which are analyzed to determine the gaze direction of the user. In one implementation, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 1412, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 1426 is configured to provide signals to tactile feedback hardware included in either the HMD 102 or another device operated by the user, such as interface object 104. The tactile feedback may take the form of various kinds of tactile sensations, such as vibration feedback, temperature feedback, pressure feedback, etc. The interface object 104 can include corresponding hardware for rendering such forms of tactile feedback.

Figure 8:
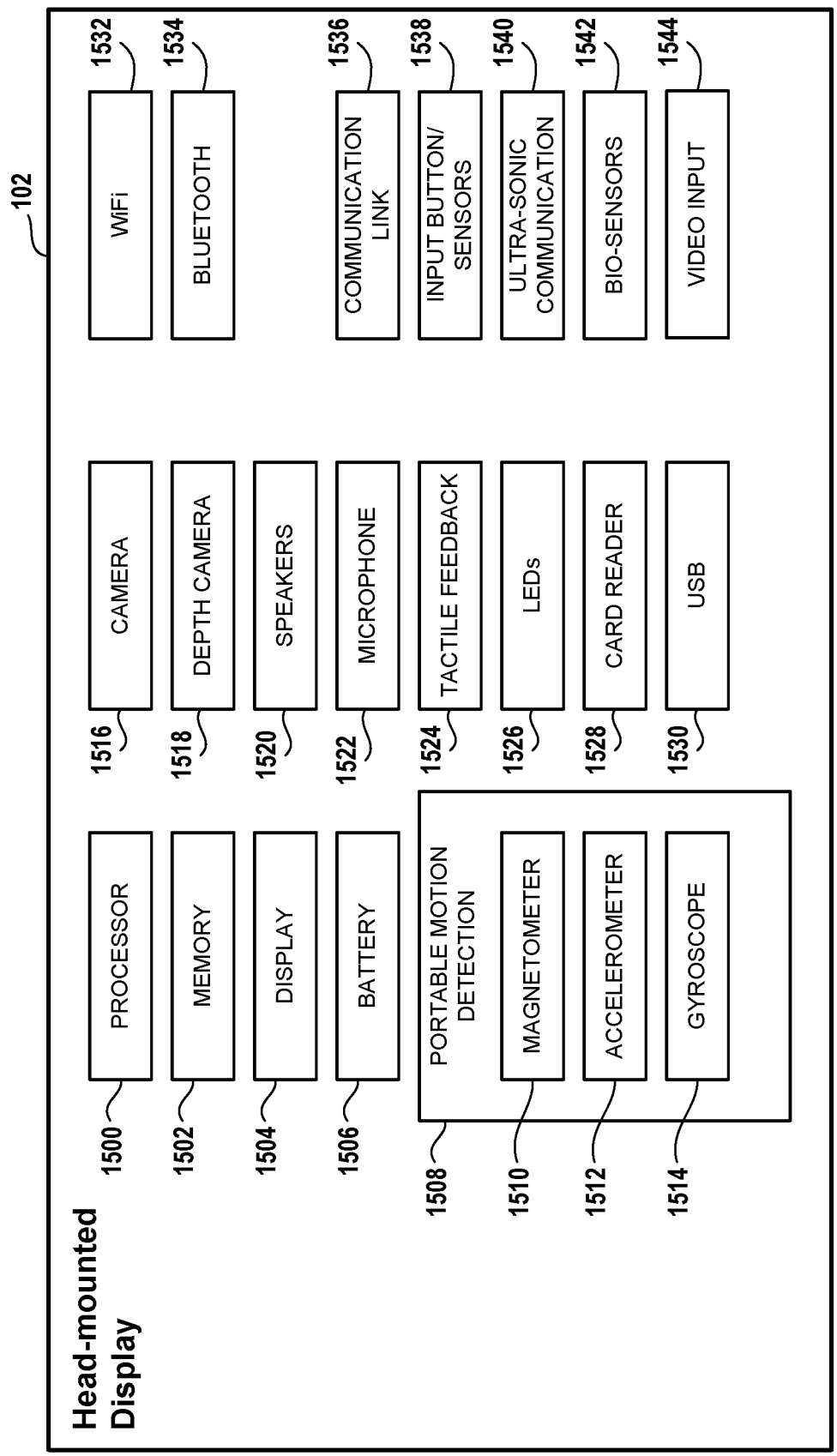
FIG. 8 illustrates components of a head-mounted display, in accordance with an implementation of the disclosure.

With reference to FIG. 8, a diagram illustrating components of a head-mounted display 102 is shown, in accordance with an implementation of the disclosure. The head-mounted display 102 includes a processor 1500 for executing program instructions. A memory 1502 is provided for storage purposes, and may include both volatile and non-volatile memory. A display 1504 is included which provides a visual interface that a user may view. A battery 1506 is provided as a power source for the head-mounted display 102. A motion detection module 1508 may include any of various kinds of motion sensitive hardware, such as a magnetometer 1510, an accelerometer 1512, and a gyroscope 1514.

An accelerometer is a device for measuring acceleration and gravity induced reaction forces. Single and multiple axis models are available to detect magnitude and direction of the acceleration in different directions. The accelerometer is used to sense inclination, vibration, and shock. In one implementation, three accelerometers 1512 are used to provide the direction of gravity, which gives an absolute reference for two angles (world-space pitch and world-space roll).

A magnetometer measures the strength and direction of the magnetic field in the vicinity of the head-mounted display. In one implementation, three magnetometers 1510 are used within the head-mounted display, ensuring an absolute reference for the world-space yaw angle. In one implementation, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one implementation, accelerometer 1512 is used together with magnetometer 1510 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one implementation, three gyroscopes 1514 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1516 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1518 may be included in the head-mounted display 102 for sensing depth information of objects in a real environment.

The head-mounted display 102 includes speakers 1520 for providing audio output. Also, a microphone 1522 may be included for capturing audio from the real environment, including sounds from the ambient environment, speech made by the user, etc. The head-mounted display 102 includes tactile feedback module 1524 for providing tactile feedback to the user. In one implementation, the tactile feedback module 1524 is capable of causing movement and/or vibration of the head-mounted display 102 so as to provide tactile feedback to the user.

LEDs 1526 are provided as visual indicators of statuses of the head-mounted display 102. For example, an LED may indicate battery level, power on, etc. A card reader 1528 is provided to enable the head-mounted display 102 to read and write information to and from a memory card. A USB interface 1530 is included as one example of an interface for enabling connection of peripheral devices, or connection to other devices, such as other portable devices, computers, etc. In various implementations of the head-mounted display 102, any of various kinds of interfaces may be included to enable greater connectivity of the head-mounted display 102.

A WiFi module 1532 is included for enabling connection to the Internet or a local area network via wireless networking technologies. Also, the head-mounted display 102 includes a Bluetooth module 1534 for enabling wireless connection to other devices. A communications link 1536 may also be included for connection to other devices. In one implementation, the communications link 1536 utilizes infrared transmission for wireless communication. In other implementations, the communications link 1536 may utilize any of various wireless or wired transmission protocols for communication with other devices.

Input buttons/sensors 1538 are included to provide an input interface for the user. Any of various kinds of input interfaces may be included, such as buttons, touchpad, joystick, trackball, etc. An ultra-sonic communication module 1540 may be included in head-mounted display 102 for facilitating communication with other devices via ultra-sonic technologies.

Bio-sensors 1542 are included to enable detection of physiological data from a user. In one implementation, the bio-sensors 1542 include one or more dry electrodes for detecting bio-electric signals of the user through the user's skin.

A video input 1544 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various implementations of the disclosure, the head-mounted display 102 may or may not include some of the various aforementioned components. Implementations of the head-mounted display 102 may additionally include other components not presently described, but known in the art, for purposes of facilitating aspects of the present disclosure as herein described.

Figure 9:
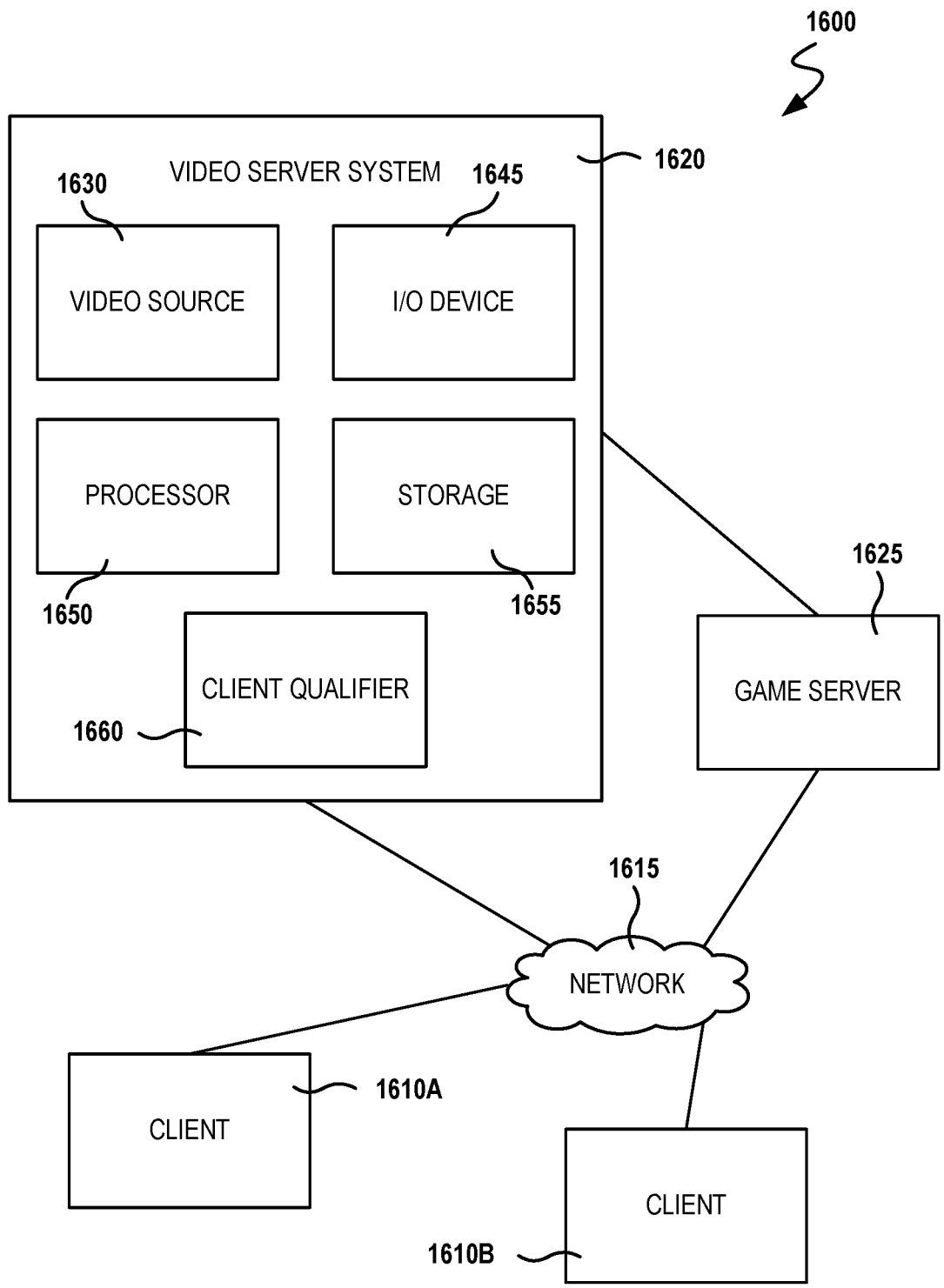
FIG. 9 is a block diagram of a Game System 1600, according to various implementations of the disclosure.

FIG. 9 is a block diagram of a Game System 1600, according to various implementations of the disclosure. Game System 1600 is configured to provide a video stream to one or more Clients 1610 via a Network 1615. Game System 1600 typically includes a Video Server System 1620 and an optional game server 1625. Video Server System 1620 is configured to provide the video stream to the one or more Clients 1610 with a minimal quality of service. For example, Video Server System 1620 may receive a game command that changes the state of or a point of view within a video game, and provide Clients 1610 with an updated video stream reflecting this change in state with minimal lag time. The Video Server System 1620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1610, referred to herein individually as 1610A, 1610B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1610 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1610 or on a separate device such as a monitor or television. Clients 1610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1610 are optionally geographically dispersed. The number of clients included in Game System 1600 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD may cooperate with the video server system 1620 to deliver a game viewed through the HMD. In one implementation, the game console receives the video stream from the video server system 1620, and the game console forwards the video stream, or updates to the video stream, to the HMD for rendering.

Clients 1610 are configured to receive video streams via Network 1615. Network 1615 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1610 may, but are not required to, further include systems configured for modifying received video. For example, a Client may be configured to perform further rendering, to overlay one video image on another video image, to crop a video image, and/or the like. For example, Clients 1610 may be configured to receive various types of video frames, such as I-frames, P-frames and B-frames, and to process these frames into images for display to a user. In some implementations, a member of Clients 1610 is configured to perform further rendering, shading, conversion to 3-D, or like operations on the video stream. A member of Clients 1610 is optionally configured to receive more than one audio or video stream. Input devices of Clients 1610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1610 is generated and provided by Video Server System 1620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1610 are typically configured to receive inputs from a user. These inputs may include game commands configured to change the state of the video game or otherwise affect game play. The game commands can be received using input devices and/or may be automatically generated by computing instructions executing on Clients 1610. The received game commands are communicated from Clients 1610 via Network 1615 to Video Server System 1620 and/or Game Server 1625. For example, in some implementations, the game commands are communicated to Game Server 1625 via Video Server System 1620. In some implementations, separate copies of the game commands are communicated from Clients 1610 to Game Server 1625 and Video Server System 1620. The communication of game commands is optionally dependent on the identity of the command Game commands are optionally communicated from Client 1610A through a different route or communication channel that that used to provide audio or video streams to Client 1610A.

Game Server 1625 is optionally operated by a different entity than Video Server System 1620. For example, Game Server 1625 may be operated by the publisher of a multiplayer game. In this example, Video Server System 1620 is optionally viewed as a client by Game Server 1625 and optionally configured to appear from the point of view of Game Server 1625 to be a prior art client executing a prior art game engine. Communication between Video Server System 1620 and Game Server 1625 optionally occurs via Network 1615. As such, Game Server 1625 can be a prior art multiplayer game server that sends game state information to multiple clients, one of which is game server system 1620. Video Server System 1620 may be configured to communicate with multiple instances of Game Server 1625 at the same time. For example, Video Server System 1620 can be configured to provide a plurality of different video games to different users. Each of these different video games may be supported by a different Game Server 1625 and/or published by different entities. In some implementations, several geographically distributed instances of Video Server System 1620 are configured to provide game video to a plurality of different users. Each of these instances of Video Server System 1620 may be in communication with the same instance of Game Server 1625. Communication between Video Server System 1620 and one or more Game Server 1625 optionally occurs via a dedicated communication channel. For example, Video Server System 1620 may be connected to Game Server 1625 via a high bandwidth channel that is dedicated to communication between these two systems.

Video Server System 1620 comprises at least a Video Source 1630, an I/O Device 1645, a Processor 1650, and non-transitory Storage 1655. Video Server System 1620 may include one computing device or be distributed among a plurality of computing devices. These computing devices are optionally connected via a communications system such as a local area network.

Video Source 1630 is configured to provide a video stream, e.g., streaming video or a series of video frames that form a moving picture. In some implementations, Video Source 1630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1625. Game Server 1625 may maintain a copy of the state of the game based on game commands received from multiple players using geographically disperse clients. In these cases, the game state is provided by Game Server 1625 to Video Source 1630, wherein a copy of the game state is stored and rendering is performed. Game Server 1625 may receive game commands directly from Clients 1610 via Network 1615, and/or may receive game commands via Video Server System 1620.

Video Source 1630 typically includes rendering logic, e.g., hardware, firmware, and/or software stored on a computer readable medium such as Storage 1655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1610. For example, the raw video (which may include audio) may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp4, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1630 includes a video recording device such as a camera. This camera may be used to generate delayed or live video that can be included in the video stream of a computer game. The resulting video stream optionally includes both rendered images and images recorded using a still or video camera. Video Source 1630 may also include storage devices configured to store previously recorded video to be included in a video stream. Video Source 1630 may also include motion or positioning sensing devices configured to detect motion or position of an object, e.g., person, and logic configured to determine a game state or produce video-based on the detected motion and/or position.

Video Source 1630 is optionally configured to provide overlays configured to be placed on other video. For example, these overlays may include a command interface, log in instructions, messages to a game player, images of other game players, video feeds of other game players (e.g., webcam video). In implementations of Client 1610A including a touch screen interface or a gaze detection interface, the overlay may include a virtual keyboard, joystick, touch pad, and/or the like. In one example of an overlay a player's voice is overlaid on an audio stream. Video Source 1630 optionally further includes one or more audio sources.

In implementations wherein Video Server System 1620 is configured to maintain the game state based on input from more than one player, each player may have a different point of view comprising a position and direction of view. Video Source 1630 is optionally configured to provide a separate video stream for each player based on their point of view. Further, Video Source 1630 may be configured to provide a different frame size, frame data size, and/or encoding to each of Client 1610. Video Source 1630 is optionally configured to provide 3-D video.

I/O Device 1645 is configured for Video Server System 1620 to send and/or receive information such as video, commands, requests for information, a game state, gaze information, device motion, device location, user motion, client identities, player identities, game commands, security information, audio, and/or the like. I/O Device 1645 typically includes communication hardware such as a network card or modem. I/O Device 1645 is configured to communicate with Game Server 1625, Network 1615, and/or Clients 1610.

Processor 1650 is configured to execute logic, e.g. software, included within the various components of Video Server System 1620 discussed herein. For example, Processor 1650 may be programmed with software instructions in order to perform the functions of Video Source 1630, Game Server 1625, and/or a Client Qualifier 1660. Video Server System 1620 optionally includes more than one instance of Processor 1650. Processor 1650 may also be programmed with software instructions in order to execute commands received by Video Server System 1620, or to coordinate the operation of the various elements of Game System 1600 discussed herein. Processor 1650 may include one or more hardware device. Processor 1650 is an electronic processor.

Storage 1655 includes non-transitory analog and/or digital storage devices. For example, Storage 1655 may include an analog storage device configured to store video frames. Storage 1655 may include a computer readable digital storage, e.g. a hard drive, an optical drive, or solid state storage. Storage 1615 is configured (e.g. by way of an appropriate data structure or file system) to store video frames, artificial frames, a video stream including both video frames and artificial frames, audio frame, an audio stream, and/or the like. Storage 1655 is optionally distributed among a plurality of devices. In some implementations, Storage 1655 is configured to store the software components of Video Source 1630 discussed elsewhere herein. These components may be stored in a format ready to be provisioned when needed.

Video Server System 1620 optionally further comprises Client Qualifier 1660. Client Qualifier 1660 is configured for remotely determining the capabilities of a client, such as Clients 1610A or 1610B. These capabilities can include both the capabilities of Client 1610A itself as well as the capabilities of one or more communication channels between Client 1610A and Video Server System 1620. For example, Client Qualifier 1660 may be configured to test a communication channel through Network 1615.

Client Qualifier 1660 can determine (e.g., discover) the capabilities of Client 1610A manually or automatically. Manual determination includes communicating with a user of Client 1610A and asking the user to provide capabilities. For example, in some implementations, Client Qualifier 1660 is configured to display images, text, and/or the like within a browser of Client 1610A. In one implementation, Client 1610A is an HMD that includes a browser. In another implementation, client 1610A is a game console having a browser, which may be displayed on the HMD. The displayed objects request that the user enter information such as operating system, processor, video decoder type, type of network connection, display resolution, etc. of Client 1610A. The information entered by the user is communicated back to Client Qualifier 1660.

Automatic determination may occur, for example, by execution of an agent on Client 1610A and/or by sending test video to Client 1610A. The agent may comprise computing instructions, such as java script, embedded in a web page or installed as an add-on. The agent is optionally provided by Client Qualifier 1660. In various implementations, the agent can find out processing power of Client 1610A, decoding and display capabilities of Client 1610A, lag time reliability and bandwidth of communication channels between Client 1610A and Video Server System 1620, a display type of Client 1610A, firewalls present on Client 1610A, hardware of Client 1610A, software executing on Client 1610A, registry entries within Client 1610A, and/or the like.

Client Qualifier 1660 includes hardware, firmware, and/or software stored on a computer readable medium. Client Qualifier 1660 is optionally disposed on a computing device separate from one or more other elements of Video Server System 1620. For example, in some implementations, Client Qualifier 1660 is configured to determine the characteristics of communication channels between Clients 1610 and more than one instance of Video Server System 1620. In these implementations the information discovered by Client Qualifier can be used to determine which instance of Video Server System 1620 is best suited for delivery of streaming video to one of Clients 1610.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

What is claimed is:

1. A non-transitory computer readable medium having program instructions embodied thereon, the program instructions being configured to, when executed by a computing device, cause said computing device to execute an interface editor that performs the following operations:
   rendering, by the interface editor, through a head-mounted display (HMD) a view of a three-dimensional virtual space, the interface editor being configured to enable placement of user interface elements in the virtual space to define a virtual reality user interface for an interactive application, such that the placement of the user interface elements by the interface editor sets locations of the user interface elements in the virtual space for a future user of the interactive application;
   wherein the interface editor is configured to define within the virtual space a central zone and a lateral zone for placement of the user interface elements, the central zone being a first set region of the virtual space at a front-facing direction from a viewpoint in the virtual space from which the future user of the interactive application will view the virtual reality user interface when interacting with the interactive application, the lateral zone being a second set region of the virtual space that is adjacent to the central zone;
   receiving, by the interface editor, input indicating an attempt to move a given user interface element from the central zone to the lateral zone;
   responsive to receiving the input, generating, by the interface editor, a counteractive response that opposes the attempt to move the given user interface element from the central zone to the lateral zone.

2. The non-transitory computer readable medium of claim 1, wherein the central zone spans a horizontal angle having a vertex at the viewpoint in the virtual space, the horizontal angle being approximately 90 to 100 degrees, the lateral zone spanning an additional angle adjacent to the horizontal angle.

3. The non-transitory computer readable medium of claim 1, wherein the input is generated from a controller device configured to control positioning of the given user interface element in the virtual space.

4. The non-transitory computer readable medium of claim 1, wherein the counteractive response includes maintaining the given user interface element within the central zone.

5. The non-transitory computer readable medium of claim 4, wherein maintaining the given user interface element within the central zone is performed until the input exceeds a predefined threshold of time and/or intended movement of the given user interface element.

6. The non-transitory computer readable medium of claim 1, wherein the counteractive response includes one or more of a visual notification rendered in the virtual space, an audio notification, and/or a tactile feedback notification.

7. The non-transitory computer readable medium of claim 1,
wherein the central zone is the first set region of the virtual space such that movements of the HMD do not alter boundaries of the central zone in the virtual space;
wherein the lateral zone is the second set region of the virtual space such that movements of the HMD do not alter boundaries of the lateral zone in the virtual space.

8. A method executed by a computing device, comprising:
rendering through a head-mounted display (HMD) a view of a three-dimensional virtual space, the interface editor being configured to enable placement of user interface elements in the virtual space to define a virtual reality user interface for an interactive application, such that the placement of the user interface elements by the interface editor sets locations of the user interface elements in the virtual space for a future user of the interactive application;
defining within the virtual space a central zone and a lateral zone for placement of the user interface elements, the central zone being a first set region of the virtual space at a front-facing direction from a viewpoint in the virtual space from which the future user of the interactive application will view the virtual reality user interface when interacting with the interactive application, the lateral zone being a second set region of the virtual space that is adjacent to the central zone;
receiving input indicating an attempt to move a given user interface element from the central zone to the lateral zone;
responsive to receiving the input, generating a counteractive response that opposes the attempt to move the given user interface element from the central zone to the lateral zone.

9. The method of claim 8, wherein the central zone spans a horizontal angle having a vertex at the viewpoint in the virtual space, the horizontal angle being approximately 90 to 100 degrees, the lateral zone spanning an additional angle adjacent to the horizontal angle.

10. The method of claim 8, wherein the input is generated from a motion controller configured to control positioning of the given user interface element in the virtual space.

11. The method of claim 8, wherein the counteractive response includes maintaining the given user interface element within the central zone.

12. The method of claim 11, wherein maintaining the given user interface element within the central zone is performed until the input exceeds a predefined threshold of time and/or intended movement of the given user interface element.

13. The method of claim 8, wherein the counteractive response includes one or more of a visual notification rendered in the virtual space, an audio notification, and/or a tactile feedback notification.

14. A system, comprising:
a head-mounted display (HMD);
a computing device connected to the HMD, the computing device executing an interface editor that performs the following operations:
rendering, by the interface editor, through a head-mounted display (HMD) a view of a three-dimensional virtual space, the interface editor being configured to enable placement of user interface elements in the virtual space to define a virtual reality user interface for an interactive application, such that the placement of the user interface elements by the interface editor sets locations of the user interface elements in the virtual space for a future user of the interactive application;
wherein the interface editor is configured to define within the virtual space a central zone and a lateral zone for placement of the user interface elements, the central zone being a first set region of the virtual space at a front-facing direction from a viewpoint in the virtual space from which the future user of the interactive application will view the virtual reality user interface when interacting with the interactive application, the lateral zone being a second set region of the virtual space that is adjacent to the central zone;
receiving, by the interface editor, input indicating an attempt to move a given user interface element from the central zone to the lateral zone;
responsive to receiving the input, generating, by the interface editor, a counteractive response that opposes the attempt to move the given user interface element from the central zone to the lateral zone.

15. The system of claim 14, wherein the central zone spans a horizontal angle having a vertex at the viewpoint in the virtual space, the horizontal angle being approximately 90 to 100 degrees, the lateral zone spanning an additional angle adjacent to the horizontal angle.

16. The system of claim 14, wherein the input is generated from a motion controller configured to control positioning of the given user interface element in the virtual space.

17. The system of claim 14, wherein the counteractive response includes maintaining the given user interface element within the central zone.

18. The system of claim 17, wherein maintaining the given user interface element within the central zone is performed until the input exceeds a predefined threshold of time and/or intended movement of the given user interface element.

19. The system of claim 17, wherein maintaining the given user interface element within the central zone is performed until a predefined secondary input is received.

20. The system of claim 14, wherein the counteractive response includes one or more of a visual notification rendered in the virtual space, an audio notification, and/or a tactile feedback notification.

* * * * *